United States Patent
Wolschleger et al.

(10) Patent No.: US 11,192,995 B2
(45) Date of Patent: Dec. 7, 2021

(54) HEAT EXPANDABLE FOAM FOR LOW TEMPERATURE CURE

(71) Applicant: SIKA TECHNOLOGY AG, Baar (CH)

(72) Inventors: Leslie Wolschleger, Clarkston, MI (US); Artur Marfinati, Sao Bernardo do Campo (BR); Geng Lin, Rochester Hills, MI (US); Cendrine Ribot, Dietikon (CH); Dusko Paripovic, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 199 days.

(21) Appl. No.: 15/781,692

(22) PCT Filed: Dec. 15, 2016

(86) PCT No.: PCT/EP2016/081274
§ 371 (c)(1),
(2) Date: Jun. 5, 2018

(87) PCT Pub. No.: WO2017/102996
PCT Pub. Date: Jun. 22, 2017

(65) Prior Publication Data
US 2018/0355138 A1 Dec. 13, 2018

(30) Foreign Application Priority Data
Dec. 18, 2015 (EP) ..................................... 15201171

(51) Int. Cl.
*C08J 9/10* (2006.01)
*B29C 48/18* (2019.01)
(Continued)

(52) U.S. Cl.
CPC ........... *C08J 9/105* (2013.01); *B29C 45/0001* (2013.01); *B29C 48/022* (2019.02); *B29C 48/18* (2019.02); *C08J 9/0023* (2013.01); *C08J 9/0028* (2013.01); *C08J 9/0061* (2013.01); *C08J 9/103* (2013.01); *C08J 9/104* (2013.01); *C08J 9/36* (2013.01);
(Continued)

(58) Field of Classification Search
CPC ..... C08J 9/105; C08J 9/36; C08J 9/104; C08J 9/0028; C08J 9/0023; C08J 9/103; C08J 9/0061; C08J 2203/184; C08J 2203/04; C08J 2201/03; C08J 2423/08; C08J 2323/08; C08J 2201/026; C08L 23/0884; C08L 23/0853; C08L 2205/03; C08L 2312/00; C08L 2203/14; C08L 2205/025; C08K 5/14; C08K 5/24; C08K 2003/265; C09J 123/0853; B29C 48/022; B29C 48/18; B29C 45/0001; C09D 123/0853; C09D 5/00; B29K 2105/0005; B29K 2023/083
See application file for complete search history.

(56) References Cited

U.S. PATENT DOCUMENTS 5,266,133 A 11/1993 Hanley et al.
2007/0265364 A1* 11/2007 Oner-Deliomanli .... B29C 44/12
521/134
(Continued)

FOREIGN PATENT DOCUMENTS

DE 10 2011 080 223 A1 2/2013
EP 1 772 480 A1 4/2007
(Continued)

OTHER PUBLICATIONS

Zhang et al., "Urea-activated 4,4'-oxibis-(benzenesulfonyl hydrazide) as foaming agent for low-density unsaturated polyester resin manufacturing", J. Appl. Poly. Sci., (Sep. 2015) (Year: 2015).*
Alger, Polymer Science Dictionary, 2nd edition, Chapman & Hall (1997) (Year: 1997).*
Rowak AG, "Competence in Bonding Technologies, Ethylenvinylacetat", Rowak AG http://www.rowak.ch/en/glossary/ethylenvinylacetat.php?filetype=pdf (Jul. 11, 2012) (Year: 2012).*
"Cost Saving Opportunities Push Foaming Agents Forward", Plastic Additives & Compounding, pp. 22-25, Sep./Oct. 2006 (Year: 2006).*
(Continued)

*Primary Examiner* — Michael N Orlando
*Assistant Examiner* — Christopher W Raimund
(74) *Attorney, Agent, or Firm* — Oliff PLC

(57) ABSTRACT

A thermally expandable composition, including at least one polymer, cross-linkable by peroxide, at least one peroxide, preferably at least one antioxidant, at least one chemical blowing agent, and at least one activator, wherein the activator includes at least one compound selected from formula (I),

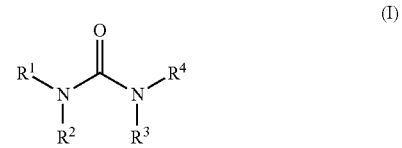

wherein radicals $R^1$ and $R^4$ represent hydrogen atoms or monovalent alkyl radicals with 1 to 10 carbon atoms which optionally include oxygen atoms; $R^2$ and $R^3$ represent hydrogen atoms or monovalent alkyl radicals with 1 to 10 carbon atoms which optionally include oxygen atoms, nitrogen atoms, and/or aromatic moieties or $R^2$ and $R^3$ together form a divalent alkyl radical with 1 to 10 carbon atoms which optionally includes oxygen atoms, nitrogen atoms or aromatic moieties. The composition shows excellent properties in terms of expansion stability over a wide temperature range, can be expanded at temperatures below 150° C. and is suitable for baffle and/or reinforcement elements.

16 Claims, No Drawings

(51) Int. Cl.

| | |
|---|---|
| *B29C 48/00* | (2019.01) |
| *C08J 9/00* | (2006.01) |
| *C08L 23/08* | (2006.01) |
| *C09J 123/08* | (2006.01) |
| *C08J 9/36* | (2006.01) |
| *C08K 5/24* | (2006.01) |
| *C08K 5/14* | (2006.01) |
| *B29C 45/00* | (2006.01) |
| *C09D 5/00* | (2006.01) |
| *C09D 123/08* | (2006.01) |
| *C08K 3/26* | (2006.01) |
| *B29K 23/00* | (2006.01) |
| *B29K 105/00* | (2006.01) |

(52) U.S. Cl.
CPC .............. *C08K 5/14* (2013.01); *C08K 5/24* (2013.01); *C08L 23/0853* (2013.01); *C08L 23/0884* (2013.01); *C09D 5/00* (2013.01); *C09D 123/0853* (2013.01); *C09J 123/0853* (2013.01); *B29K 2023/083* (2013.01); *B29K 2105/0005* (2013.01); *C08J 2201/026* (2013.01); *C08J 2201/03* (2013.01); *C08J 2203/04* (2013.01); *C08J 2203/184* (2013.01); *C08J 2323/08* (2013.01); *C08J 2423/08* (2013.01); *C08K 2003/265* (2013.01); *C08L 2203/14* (2013.01); *C08L 2205/025* (2013.01); *C08L 2205/03* (2013.01); *C08L 2312/00* (2013.01)

(56) References Cited

U.S. PATENT DOCUMENTS

| | | | |
|---|---|---|---|
| 2008/0176969 A1* | 7/2008 | Tahri ................ | G10K 11/16 521/99 |
| 2009/0221778 A1* | 9/2009 | Muramatsu ......... | C09D 183/04 526/279 |
| 2012/0010367 A1* | 1/2012 | Prunarety ........... | B62D 29/002 525/185 |
| 2014/0131910 A1 | 5/2014 | Kohlstrung et al. | |
| 2015/0252165 A1* | 9/2015 | Frick .................. | C08J 9/0085 428/36.4 |
| 2018/0215888 A1 | 8/2018 | Kohlstrung et al. | |

FOREIGN PATENT DOCUMENTS

| | | |
|---|---|---|
| JP | H08-104767 A | 4/1996 |
| JP | 2001316538 A | 11/2001 |
| JP | 2004-168856 A | 6/2004 |
| JP | 2010-254775 A | 11/2010 |
| WO | 2007/003909 A1 | 1/2007 |
| WO | WO-2014072334 A1 * 5/2014 ............ C08J 9/0085 |  |

OTHER PUBLICATIONS

Feb. 28, 2017 International Search Report issued in International Patent Application No. PCT/EP2016/081274.

Feb. 28, 2017 Written Opinion of the International Searching Authority issued in International Patent Application No. PCT/EP2016/081274.

Mar. 8, 2020 Office Action issued in Brazilian Patent Application No. 11 2018 010985 1.

\* cited by examiner

HEAT EXPANDABLE FOAM FOR LOW TEMPERATURE CURE

TECHNICAL FIELD

The present invention relates to a thermally expandable thermoplastic composition, resulting in a stable foam material, as well as a baffle and/or reinforcement element for hollow structures comprising such a thermally expandable composition, a process for manufacturing such a baffle and/or reinforcement element, its use to seal, baffle, or reinforce a hollow structure, and a method for sealing, baffling, or reinforcing a hollow structure.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including in the vehicle's structural pillars and in the sheet metal of the vehicle doors. It is often desirable to seal such orifices and cavities so as to minimise noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by e.g. a liquid. For example, during the manufacture process of a vehicle, the hollow parts of a metal frame can still be largely covered by an electro-coating ("e-coat") liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to 1500% or more, forming a foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers that can be cross-linked by peroxides, such as ethylene-vinyl acetate polymers. In order to obtain foams, these compositions furthermore contain blowing agents. Under activation conditions, such as elevated temperature, curing of the cross-linkable network takes place, while simultaneously the blowing agent decomposes and releases gases. This leads to the above mentioned volume expansion and the formation of a stable foam which in ideal cases fills the cavity as intended and adheres to its walls. Such a system is for example disclosed in DE 10 2011 080 223 A1. Normally, these compositions form stable foams at temperatures around 180° C., which corresponds to heat-treatment conditions generally applied in automotive manufacturing, for example during an e-coat bake process. Recent developments in automotive manufacturing, however, have triggered the demand for materials that are able to form stable foams at significantly lower temperatures, i.e. 150° C., or less.

Such low-bake compositions are not yet readily available. While it is possible to formulate expandable compositions to foam in a controlled way at temperatures below 150° C., especially within the demanding time limits of automotive line assembly, they typically do not show a stable expansion over a wide temperature range and show poor performance at higher temperature, where the blowing agent decomposes too fast and no small-cellular foam is produced.

It is thus desirable to obtain a thermally expandable composition that exhibits a controlled, uniform expansion over a broad temperature range of, for example, between 120° C. and 200° C., and in particular at so-called ultra-low temperatures between 120° C. and 150° C., and produces stable foam with good adhesion properties at all temperatures within this range.

SUMMARY OF THE INVENTION

It is an object of the present invention to provide a thermally expandable composition that is able to expand uniformly over a wide temperature range, e.g. between 120° C. and 200° C., and particularly at ultra-low temperatures, i.e. between 120° C. and 150° C., and which creates stable, highly expanded foam with excellent adhesion properties.

Surprisingly, the present invention provides a solution to that problem by providing a composition comprising a polymer that is cross-linkable by peroxide, a peroxide, preferably an antioxidant, a chemical blowing agent, and an activator, wherein the activator comprises at least one urea or urea derivate.

Thus, the present invention achieves this object with the features of independent claim 1 by providing a thermally expandable composition, comprising
(a) at least one polymer P, cross-linkable by peroxide,
(b) at least one peroxide,
(c) preferably at least one antioxidant,
(d) at least one chemical blowing agent B,
(e) at least one activator A,
wherein said activator A comprises at least one compound selected from formula (I),

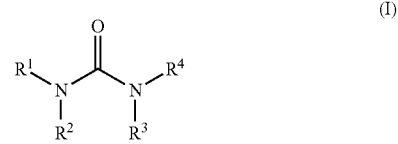

wherein radicals $R^1$ and $R^4$ independently represent hydrogen atoms or monovalent alkyl radicals with 1 to 10 carbon atoms which furthermore optionally comprise oxygen atoms;
$R^2$ and $R^3$ independently represent hydrogen atoms or monovalent alkyl radicals with 1 to 10 carbon atoms which furthermore optionally comprise oxygen atoms, nitrogen atoms, and/or aromatic moieties or together form a divalent alkyl radical with 1 to 10 carbon atoms and which furthermore optionally comprises oxygen atoms, nitrogen atoms or aromatic moieties.

The composition according to the present invention is particularly suitable to be used in a sealing, baffle or reinforcement element, for example in automotive applications. Further aspects of the present invention are subject of other independent claims. Preferred embodiments of the invention are subject of dependent claims.

DETAILED DESCRIPTION OF THE INVENTION

The unit term "wt.-%" means percentage by weight, based on the weight of the respective total composition, if not otherwise specified. The terms "weight" and "mass" are used interchangeably throughout this document.

The term "functionality" in connection with a molecule describes in this document the number of chemical functional groups per molecule. The term "polyfunctional" describes a molecule with more than 1 functional groups of a given type. For example, a polyfunctional acrylate with a functionality of 3 describes a molecule with 3 acrylate groups. The term "average functionality" is used if a mixture of molecules is present that differ slightly in individual functionality, but in average exhibit a given functionality, as it is sometimes the case with technical grade chemicals.

The term "radical" used in this document in connection with polymers cross-linkable by peroxide describes, as known to a person with ordinary skill in the art of chemistry, a chemical species with an unpaired valence electron. The cross-linking reactions involved in the curing or hardening of the polymer system of the present invention follow a radical mechanism.

Melt flow index (MFI) is determined by the ASTM D1238 standard method, using a capillary rheometer at 190° C. and a weight of 2.16 kg. MFI values describe the amount of polymer coming out of the capillary under pressure of the defined weight and at the defined temperature during a given time.

Volume changes on the thermally expandable material are determined using the DIN EN ISO 1183 method of density measurement (Archimedes principle) in deionised water in combination with sample mass determined by a precision balance.

All industrial norms mentioned in this document are referring to the respective current versions at the time of filing.

The present invention comprises as a first necessary component at least one polymer P that is cross-linkable by peroxide. Principally all thermoplastic polymers or thermoplastic elastomers capable of cross-linking reactions with peroxides are suitable. The artisan skilled in the field describes polymers as "cross-linkable by peroxide" if these polymers contain functional groups, e.g. C—C double bonds, which release hydrogen atoms under influence of a radical starter, e.g. a peroxide, from their backbone or side chain, such that a radical remains that is able to radically attack other polymer chains in a subsequent step, leading to a radical chain reaction cross-linking process and ultimately to a polymer network.

Suitable polymers P include, for example, styrene-butadiene copolymers, styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, ethylene-acrylic ester copolymers, polyolefinic block copolymers, and polyolefins such as polyethylene or polypropylene.

The copolymers, meaning polymers made from more than one type of monomer, can be block type copolymers or random copolymers.

Polymers P can also be further functionalised, meaning they can contain further functional groups such as hydroxyl, carboxy, anhydride, acrylate, and/or glycidylmethacrylate groups. It is however preferred to use polymers P without such further functionalization, but in combination with reactive functionalized adhesion promoters. This approach offers a better controllability of the curing mechanism and the adhesion properties. Suitable adhesion promoters with such functionalization are discussed further below.

Preferred for the present invention is one or more polymer P with an average melt flow index (MFI) of between 1 and 200 g/10 min, preferably between 10 and 100 g/10 min, more preferably between 25 and 75 g/10 min, most preferably between 35 and 55 g/10 min.

Polymer P preferably comprises or essentially consists of ethylene-vinyl acetate (EVA). In this case, the content of vinyl acetate monomers in EVA should be between 8 and 45 wt.-%, preferably between 15 and 30 wt.-%, based on the total weight of the EVA polymer.

In a preferred embodiment, polymer P comprises EVA with 32 wt.-% vinyl acetate monomer and a MFI of 43 g/10 min.

In another preferred embodiment, polymer P comprises ethylene-butyl acrylate (EBA) copolymer with 35 wt.-% butyl acrylate monomer and a MFI of 40 g/10 min.

In cases where more than one type of polymer is used, the individual MFI combine to an average MFI of the used polymer mixture, which has to be determined according to ASTM D1238.

The thermally expandable composition according to the present invention preferably contains said at least one polymer P with an amount of between 20 and 80 wt.-%, preferably between 25 and 75 wt.-%, more preferably between 30 and 70 wt.-%, based on the weight of the total composition.

In a preferred embodiment, more than one type of polymer is used as polymer P. It was found to be beneficial for the properties of the inventive composition to use at least two types of polymer (herein named P1 and P2) with different melt flow index (MFI), one much higher than the other. For example, an especially preferred embodiment uses a first polymer P1 with an MFI of between 100 and 200 g/10 min and a second polymer P2 with an MFI of between 0.1 and 60 g/10 min, preferably between 0.1 and 10 g/10 min, preferably with a weight ratio of the two polymers P1:P2 in the composition of 0.7 to 2.0, preferably 1 to 1.7.

A preferred embodiment using two EVA copolymers comprises as polymer P1 an EVA with 18 wt.-% vinyl acetate monomer and a melt flow index (MFI) of 150 g/10 min and as polymer P2 an EVA with 28 wt.-% vinyl acetate monomer and a MFI of 6 g/10 min. Most preferred weight ratio of the two polymers P1:P2 is between 1.3 and 1.7.

When using two polymers, comprising P1 with an MFI of between 100 and 200 g/10 min and a second polymer P2 with an MFI of between 0.1 and 60 g/10 min, a preferred amount for P1 is between 1 and 35 wt.-%, preferably between 10 and 35 wt.-% and for P2 between 10 and 50 wt.-%, preferably between 15 and 30 wt.-%.

Another preferred embodiment uses two ethylene-butyl acrylate (EBA) copolymers, comprising as P1 an EBA with 34 wt.-% butyl acrylate monomer and a MFI of 40 g/10 min and as P2 an EBA with 30 wt.-% butyl acrylate monomer and a MFI of 2 g/10 min.

A second necessary component of the thermally expandable composition according to the present invention is at least one peroxide, with an amount of between 0.2 and 2.5 wt.-%, preferably between 0.3 and 2 wt.-%, more preferably between 0.4 and 1.5 wt.-%, based on the total weight of the composition.

It is advantageous for the inventive composition to use a peroxide that is essentially inert at room temperature (23° C.) and exhibits an activation temperature suitable for the intended purpose. For example, if the composition is used for a baffle and/or reinforcement element in automotive manufacturing, an activation temperature of between 110 and 250° C. is preferred. Furthermore, it is advisable to select a peroxide with an activation temperature compatible with the decomposition temperature of the blowing agent. If those two temperatures differ too much, it may be more difficult to obtain a thermally expandable composition with optimal performance and stability. Apart from that, other, at room temperature solid components (such as in some cases polymer P) have to be compatible with these components as well, for example in terms of softening or melting point.

It is furthermore advantageous for the inventive composition to use at least one peroxide that exhibits a half-life of 10 h at a temperature of between 90° C. and 130° C. For ultra-low temperature embodiments, i.e. those optimized for expansion between 120° C. and 150° C., peroxides having a half-life of 10 h at temperatures between 50° C. and 100° C. are preferred.

Preferred peroxides for the inventive composition are organic peroxides, such as keton peroxides, diacyl peroxides, peresters, perketals, and hydroperoxides. Examples of such preferred peroxides include cumene hydroperoxide, t-butyl peroxide, bis(t-butylperoxy)-diisopropyl benzene, di(t-butylperoxy isopropyl) benzene, dicumyl peroxide, t-butylperoxy benzoate, di-alkylperoxy dicarbonate, diperoxyketals (such as 1,1-di-t-butylperoxy-3,3,5-trimethyl cyclohexane), keton peroxides (such as methyl ethyl keton peroxide), and 4,4-di-t-butylperoxy-n-butyl valerate.

Especially preferred are 3,3,5,7,7-pentamethyl-1,2,4-trioxepane, 2,5-dimethyl-2,5-di(t-butylperoxy)-3-hexyne, di-t-butyl peroxide, 2,5-dimethyl-2,5-di(t-butylperoxy) hexane, t-butyl cumyl peroxide, di(t-butylperoxy isopropyl) benzene, dicumyl peroxide, butyl-4,4-di(t-butylperoxy) valerate, t-butylperoxy-2-ethylhexyl carbonate, 1,1-di(t-butylperoxy)-3,3,5-trimethyl cyclohexane, t-butylperoxy benzoate, di(4-methylbenzoyl) peroxide, and dibenzoyl peroxide.

Most preferred peroxides for the present inventive composition include dicumyl peroxide, and/or di(t-butylperoxy-isopropyl) benzene, and/or 1,1-di(t-butylperoxy)-3,3,5-trimethyl cyclohexane, wherein 1,1-di(t-butylperoxy)-3,3,5-trimethyl cyclohexane is especially preferred. For embodiments optimized for ultra-low temperatures, i.e. between 120° C. and 140° C., dibenzoyl peroxide is most preferred.

It may be advantageous for the present invention to use peroxide that is immobilised on a support material, such as silica, kaolin, and/or calcium carbonate, or other suitable materials. This approach may facilitate handling, dosage, and evenly distribution of the peroxide in the composition. Examples for such immobilised peroxide include 40 wt.-% dicumyl peroxide on calcium carbonate, 40 wt.-% di(t-butylperoxyisopropyl) benzene on clay and silica, and 40 wt.-% 1,1-di(t-butylperoxy)-3,3,5-trimethyl cyclohexane on calcium carbonate. However, care has to be taken in such cases to correctly calculate the wt.-% and equivalents of active substance in the composition, as in this document these values always refer to active compound, and do not include possibly present support material such as calcium carbonate.

The inventive composition furthermore preferably comprises at least one antioxidant. Antioxidants are commonly used in polymer-based compositions and known to the person skilled in the art of polymer-based composition formulation. For the present invention, their use offers the advantage of a more controlled foaming process including uniform expansion of the composition and crosslinking of polymer P over a wide temperature range. While it is possible to obtain a low temperature curing system without the use of antioxidants, e.g. below 150° C., the same composition is not able to produce a stable foam at high temperatures, e.g. above 200° C. In order to obtain a composition able to produce stable foam of high quality over the whole temperature range, an antioxidant is thus required. Only the embodiments optimized for ultra-low temperatures, i.e. between 120° C. and 150° C., are recommended to be formulated without antioxidant.

Examples of suitable antioxidants include sterically hindered aromatic amines and/or sterically hindered phenols, such as bis(3,3-bis(4'-hydroxy-3-t-butylphenyl)butanoic acid) glycol ester or tetrakis (methylene(3,5-di-t-butyl-4-hydroxy-hydrocinnamate)) methane. Most preferred antioxidant is tetrakis (methylene(3,5-di-t-butyl-4-hydroxy-hydrocinnamate)) methane. Also preferred is Tetrakis(2,4-di-tert-butylphenyl)-4,4-biphenyldiphosphonite.

Antioxidants are preferably included with an amount of between 0.05 and 1.5 wt.-%, preferably between 0.075 and 1 wt.-%, more preferably between 0.1 and 0.5 wt.-%, based on the total weight of the composition.

It may be advantageous to use a synergist together with the antioxidant, or alone, without the addition of an antioxidant. Synergists improve the performance of the antioxidant, especially at high temperatures, and may lead to an even better expansion of the inventive composition. Synergists may improve the stability of the expansion also without the use of an antioxidant, since they themselves have antioxidant properties. Examples of suitable synergists include sterically hindered thioethers, such as didodecyl 3,3'-thiodipropionate, distearyl 3,3'-thiodipropionate and/or zinc-2-mercaptotoluimidazole. Most preferred is didodecyl 3,3'-thiodipropionate.

In some embodiments, in particular when comparably large volumes of the inventive composition are being prepared by a method described further below (e.g., extrusion or injection moulding), antioxidants and/or synergists may prevent or inhibit preliminary, unwanted cross-linking in the process tools, leading, for instance, to poor adhesion properties in the final product. For these processes, it has been found that styrene-type additives are especially beneficial as antioxidants, because they are superior in preventing unwanted, preliminary cross-linking in such processes. Most preferred antioxidant of this class is 2,4-diphenyl-4-methyl-1-pentene. Such antioxidants may be added in the same amounts as other antioxidants in all inventive compositions.

In a preferred embodiment, the antioxidant is used with an amount of between 0.05 and 1.5 wt.-%, preferably between 0.075 and 1 wt.-%, more preferably between 0.1 and 0.5 wt.-%, based on the total weight of the composition, together with a synergist with an amount of between 0.05 and 1.5 wt.-%, preferably between 0.075 and 1 wt.-%, more preferably between 0.1 and 0.5 wt.-%, based on the total weight of the composition.

The next essential component of the present inventive composition is at least one chemical blowing agent B.

Chemical blowing agents are organic or inorganic compounds that decompose under influence of, e.g., temperature or humidity, while at least one of the formed decomposition products is a gas.

Preferred chemical blowing agents for the present inventive composition include azo compounds, hydrazides, nitroso compounds, carbamates, and carbazides.

Suitable chemical blowing agents B include, e.g., azodicarbonamide, azoisobutytronitrile, azocyclohexyl nitrile, dinitrosopentamethylene tetramine, azodiamino benzene, benzene-1,3-sulfonyl hydrazide, calcium azide, 4,4'-diphenyldisulphonyl azide, p-toluenesulphonyl hydrazide, p-toluenesulphonyl semicarbazide, 4,4'-oxybis(benzenesulphonylhydrazide), trihydrazino triazine, and N,N'-dimethyl-N,N'-dinitrosoterephthalamide, and combinations thereof and the like.

In preferred embodiments, the blowing agent comprises or essentially consists of azodicarbonamide and/or 4,4'-oxybis(benzenesulphonyl hydrazide).

Preferably, the chemical blowing agent B is included in the present inventive composition with an amount of between 2 and 15 wt.-%, preferably between 4 and 12 wt.-%, more preferably between 5 and 10 wt.-%, based on the total weight of the composition.

The heat required for the decomposition reaction that causes the foaming (expansion) can be applied externally or internally, the latter e.g. from an exothermic reaction. Preferably, the blowing agent is activated (i.e. starts to decompose under gas release) at a temperature of less than 160° C., especially between 80° C. to 150° C., more preferably between 90° C. and 140° C.

If the present inventive thermally expandable composition finds a use in a baffle and/or reinforcement element, e.g. in automotive manufacturing, it is preferable that the activation temperature of the blowing agent is adjusted to the manufacturing conditions of the automotive part to be baffled or reinforced. As an example, the baffle and/or reinforcement element can be inserted into a cavity of a structure that needs to be treated by an electrocoating liquid, in its unexpanded state still leaving the surface of the structure accessible, and subsequently, during the heat treatment of the automotive part (i.e. the curing procedure for the electrocoating liquid), the baffle and/or reinforcement element simultaneously (or shortly thereafter) expands to its intended final shape and at least partially closes or fills the cavity. In such a case, the expansion temperature should correspond to the temperature conditions of said heat treatment, e.g. to between 140° C. and 200° C., or between 120° C. and 150° C., depending on the embodiment.

Accordingly, it is advisable to select the peroxide used in the inventive composition in such a way that its activation temperature is in the same range, or slightly below the decomposition temperature of the blowing agent. This ensures that the radical mechanisms leading to polymer cross-linking take place at a point which enables the formation of a stable, foam-like structure.

The next essential component of the present inventive composition is at least one activator A. Activator A is important for enabling the controlled decomposition of the chemical blowing agent B, especially at lower temperatures, e.g. below 150° C.

Activator A comprises at least one compound selected from formula (I),

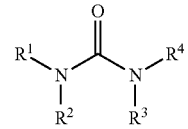

(I)

wherein radicals $R^1$ and $R^4$ independently represent hydrogen atoms or monovalent alkyl radicals with 1 to 10 carbon atoms which furthermore optionally comprise oxygen atoms;

$R^2$ and $R^3$ independently represent hydrogen atoms or monovalent alkyl radicals with 1 to 10 carbon atoms which furthermore optionally comprise oxygen atoms, nitrogen atoms, and/or aromatic moieties or together form a divalent alkyl radical with 1 to 10 carbon atoms and which furthermore optionally comprises oxygen atoms, nitrogen atoms or aromatic moieties.

In preferred embodiments, radicals $R^1$ and $R^2$ independently represent hydrogen atoms or monovalent linear or branched alkyl radicals with 1 to 10, preferably 1 to 5, more preferably 1 to 4 carbon atoms, which optionally together represent a divalent alkyl radical forming a ring structure with the adjacent nitrogen atom. In the same or different embodiments, radicals $R^3$ and $R^4$ independently represent hydrogen atoms or monovalent linear or branched alkyl radicals with 1 to 10, preferably 1 to 5, more preferably 1 to 4 carbon atoms, which optionally together represent a divalent alkyl radical forming a ring structure with the adjacent nitrogen atom. Preferred embodiments among those are urea, N-methyl urea, N,N-dimethyl urea, N,N'-dimethyl urea, N,N,N'-trimethyl urea, N,N,N',N'-tetramethyl urea, and derivates of those where some or all methyl groups are ethyl groups instead.

In very preferred embodiments, radicals $R^1$ and $R^2$ in formula (I) both represent hydrogen radicals. In the same or other preferred embodiments, radicals $R^3$ and $R^4$ both represent ethyl or methyl, preferably methyl groups.

Also very preferred are embodiments where $R^1$, $R^2$, $R^3$, and $R^4$ in formula (I) all represent ethyl or methyl, preferably methyl groups, or where $R^1$, $R^2$, and $R^3$ represent ethyl or methyl, preferably methyl groups and $R^4$ represents a hydrogen radical, or where radicals $R^1$ and $R^4$ both represent hydrogen radicals and radicals $R^2$ and $R^3$ both represent ethyl or methyl, preferably methyl groups. Among those, most preferred are N,N'-dimethyl urea and N,N,N',N'-tetramethyl urea. These two activators, when used together with blowing agent B comprising azodicarbonamide, lead to expansions of >1900% at higher temperatures, e.g. 200° C. and expansions of >1000% at lower temperatures, e.g, 140° C.

In especially preferred embodiments, $R^1$, $R^2$, $R^3$, and $R^4$ all represent hydrogen radicals, thus describing urea. This activator is especially suitable for use together with the chemical blowing agent B comprising 4,4'-oxybis(benzenesulphonyl hydrazide) and leads to exceptional expansion volumes over the whole temperature range of at least 140° C. to 200° C., with at least 1000%, preferably at least 1100% expansion at every temperature within that range.

In another especially preferred embodiment, activator A comprises a compound according to formula (I) where the radicals $R^1$ and $R^2$ both represent hydrogen radicals and radicals $R^3$ and $R^4$ both represent methyl groups, thus describing N,N-dimethyl urea. This activator A is especially suitable in combination with the chemical blowing agent B comprising azodicarbonamide. This combination leads to exceptional expansion volumes and highly stable foam over the whole temperature range of at least 140° C. to 200° C., with at least 1000%, preferably at least 1100% expansion at every temperature within that range. These expansions can be achieved over the whole temperature range with baking times as short as 30 min, preferably as short as 15 min, more preferably as short as 10 min.

The same activator A, comprising a compound according to formula (I) where the radicals $R^1$ and $R^2$ both represent hydrogen radicals and radicals $R^3$ and $R^4$ both represent methyl groups is furthermore especially suitable in combination with the chemical blowing agent B comprising 4,'-oxybis(benzenesulphonyl hydrazide). This combination leads to exceptional expansion volumes and highly stable foam in the ultra-low temperature range of between 120° C. and 150° C., with at least 900%, preferably at least 1000% expansion at every temperature within that range.

The inventive thermally expandable composition comprises such an activator A with an amount of between 0.1 and 10 wt.-%, preferably between 1 and 9 wt.-%, more preferably between 1.5 and 8 wt.-%, based on the total weight of the composition.

It is strongly advised to optimize the amount of activator A relative to the amount of blowing agent B. For the present invention, it is preferred to use an amount of activator A of between 10 and 80 wt.-%, preferably between 12 and 60 wt.-%, more preferably between 15 and 50 wt.-%, most preferably between 20 and 35 wt.-%, based on the weight of blowing agent B comprised in the composition.

It may be advantageous for the present invention to use a second activator, accelerator, or catalyst in combination with activator A. Examples of compounds suitable for this purpose include zinc compounds, such as zinc oxide, zinc acetate, zinc stearate, zinc bis(p-toluenesulphinate), or zinc bis(benzenesulphinate), titanium oxide, or magnesium oxide. Most preferred are zinc compounds, especially zinc oxide, and mixtures of zinc compounds, especially mixtures of zinc oxide and zinc acetate. These secondary activators are preferably present in the compositions in amounts between 1 and 10 wt.-%, preferably between 1.25 and 7.5 wt.-%, more preferably between 1.4 and 5 wt.-%, based on the total weight of the composition.

It is strongly advised also for optionally present secondary activators to optimize their amount relative to the amount of blowing agent B. For the present invention, it is preferred to use an amount of secondary activator of between 10 and 80 wt.-%, preferably between 12 and 60 wt.-%, more preferably between 15 and 50 wt.-%, most preferably between 20 and 35 wt.-%, based on the weight of blowing agent B comprised in the composition.

In preferred embodiments, the inventive composition also includes adhesion promoters. Preferably these substances are incorporated into the polymer network during the cross-linking reactions via functional groups similar to those present in polymer P, such as acrylate groups. The functional groups advantageous for adhesion include, for example, hydroxyl, amine, thiol, carboxyl, anhydride, acrylate, and/or glycidylmethacrylate groups. Suitable adhesion promoters include, for example, ethylene-glycidyl methacrylate copolymers. Most preferable adhesion promoters of this kind include ethylene-glycidyl methacrylate copolymers with a MFI of between 1 and 25 g/10 min, preferably between 2 and 15 g/10 min, in particular between 3 and 10 g/10 min. Such adhesion promoters have the advantage that they significantly improve the adhesion of the expanded composition on oily surfaces, such as oily steel, as for example commonly found in automotive manufacturing.

Adhesion promoters are preferably used in compositions according to the present invention with an amount of between 2 and 25 wt.-%, preferably between 5 and 20 wt.-%, more preferably between 9 and 15 wt.-%, based on the total weight of the composition.

The inventive composition may furthermore advantageously comprise small, polyfunctional acrylates, having a molecular weight of less than 2'500 g/mol, more preferably less than 1'000 g/mol, and preferably exhibit an acrylate functionality of at least 2 or 3, preferably at least 4 or 5, or more. These acrylates can improve the crosslinking of polymer P and help obtaining a stable foam structure. If present, they are preferably included with an amount of between 0.1 and 2.5 wt.-%, preferably between 0.2 and 2 wt.-%, more preferably between 0.25 and 1.5 wt.-%, based on the total weight of the composition.

Suitable acrylates with a functionality of 2 include ethylene glycol dimethacrylate, diethylene glycol dimethacrylate, triethylene glycol dimethacrylate, triethylene glycol diacrylate, tripropylene glycol dimethacrylate, 1,3-butanediol dimethacrylate, 1,4-butanediol dimethacrylate, 1,10-dodecanediol dimethacrylate, 1,6-hexandieol dimethacrylate, neopentylglycol dimethacrylate, and polybutylene glycol dimethacrylate, and hexanediol diacrylate. Most preferred acrylate with functionality of 2 is hexanediol diacrylate. Suitable acrylates with a functionality of 3 or higher include glycerol triacrylate, pentaerythritol triacrylate, pentaerythritol trimethacrylate, trimethylolpropane triacrylate, trimethylolpropane trimethacrylate, tetramethylolmethane tetraacrylate, Di-(trimethylolpropane) tetraacrylate, pentraerythritol tetraacrylate, dipentaerythritol pentaacrylate, dipentaerythritol hexaacrylate, tri(2-methacryloxyethyl) trimellitate, tri(2-acryloxyethyl) isocyanurate, as well as their ethoxylated or propoxylated derivates. Most preferred acrylate with functionality of 5 is dipentaerythritol pentaacrylate. Furthermore suitable are highly functional, hyperbranched acrylates with functionalities of between 6 and 16, or higher. Examples of such acrylates include hyperbranched polyester-polyacrylates.

Apart from the essential and optional ingredients listed above, the present inventive thermally expandable composition may contain other components commonly used in such compositions and known to the ordinarily skilled artisan in the field. These include, for example, fillers, colorants, dispersion aids or homogenizers, other adhesion promoters, stabilizers, and the like.

Suitable as fillers are, e.g., ground or precipitated calcium carbonate, calcium-magnesium carbonate, talcum, gypsum, graphite, barite, silica, silicates, mica, wollastonite, carbon black, or the mixtures thereof, or the like.

Fillers are, if at all, preferably incorporated in the inventive compositions with an amount of between 1 and 15 wt.-%, based on the total weight of the composition.

Colorants or dyes, such as pigments, e.g. on the basis of carbon black, may be included in the present inventive compositions. Their amount is preferably between 0 and 1 wt.-%, based on the total weight of the composition.

Processing agents as well as tackifiers may be beneficial for the present inventive composition in order to facilitate a homogeneously mixed composition. Preferably used such compounds include hydrocarbon resins, for example aromatically modified C5 hydrocarbon resins, or polyolefin waxes, for example homopolymer polyolefin waxes with melting points between 100° C. and 12° C. Such compounds are preferably included in the inventive compositions with an amount of between 2 and 10 wt.-%, preferably between 4 and 8 wt.-%, more preferably between 5 and 7 wt.-%, based on the total weight of the composition.

The compositions according to the present inventions can be manufactured by mixing the components in any suitable mixing apparatus, e.g. in a dispersion mixer, planetary mixer, double screw mixer, continuous mixer, extruder, or dual screw extruder.

It may be advantageous to heat the components before or during mixing, either by applying external heat sources or by friction generated by the mixing process itself, in order to facilitate processing of the components into a homogeneous mixture by decreasing viscosities and/or melting of individual components. However, care has to be taken, e.g. by temperature monitoring and use of cooling devices where appropriate, not to exceed the activation temperatures of the blowing agent and/or peroxide. The final composition is preferably essentially solid at room temperature (23° C.), meaning that it does not visibly deform at this temperature just by means of gravity during at least 24 h.

After mixing, the resulting composition may be shaped into its desired form by, e.g., extruding, blow-moulding, pelleting, injection moulding, compression moulding, punching or stamping or any other suitable process.

The thermally expandable compositions may be produced in a substantially one-step process, involving the addition of all components in a series and/or simultaneously. However, it may also be advantageous to formulate the composition as a two-part system, or even multipart system, and mix these parts into the final composition at a later stage. Such an approach may, for example, increase shelf life of the composition in places with demanding conditions (such as extraordinarily high temperatures), optimise storage room demand and transport weight, and allow for tailor-made, modular compositions regarding different applications.

The expansion of the thermally expandable composition according to the present invention is triggered by heat. This means, both the blowing agent and the peroxide component are activated by a thermal process that exceeds their respective activation temperature and exhibits a duration long enough for both processes (peroxide-initiated radical polymerisation and decomposition of the blowing agent including gas formation) to proceed until the expandable material has expanded and cured into its intended final (sufficiently expanded and stable) state. The optimal temperature and duration (dwell time) depends on the blowing agent and peroxide used in the inventive composition. These values are provided by the manufacturers of such components and/or are known to the ordinarily skilled artisan. Commonly, such activation temperatures are in the range of 120° C. to 250° C., preferably 140° C. to 200° C., and require a dwell time of between 5 and 90 min, preferably between 10 and 60 min.

Another aspect of the present invention is the use of such thermally expandable compositions for the manufacturing of baffle and/or reinforcement elements. Such elements are used to seal, baffle, and/or reinforce hollow structures, e.g. a cavity in a hollow structural part of an automobile. Hollow parts in cars may include body components (e.g., panels), frame components (e.g., hydroformed tubes), pillar structures (e.g., A, B, C, or D-pillars), bumpers, roofs, or the like.

With regard to activation of the thermally expandable composition according to the present invention when used in automotive manufacturing, it is advantageous to couple the thermal activation of the composition with another process step involving heat treatment. An example for such a process step is electrocoating (cathodic dip painting/coating) of the chassis or car body.

In one preferred embodiment, such a baffle and/or reinforcement element for hollow structures consists essentially of a thermally expandable composition. In this case, it is advantageous to design the shape of the element in a way that it can be easily fitted into and attached to the walls of the hollow structure to be baffled and/or reinforced. Manufacturing is in this case preferably done by injection moulding, punching or stamping, or extrusion through a shape template.

In another preferred embodiment, such a baffle and/or reinforcement element for hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Said carrier element may consist of any material that can be processed into a shape useable for an embodiment of the present invention. Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like) or foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

The manufacturing process of a baffle and/or reinforcement element in accordance with the present invention depends largely on the material of the carrier element. If the material of the carrier element can be (injection-) moulded or extruded, the whole baffle and/or reinforcement element can be produced in a two-step injection-moulding process or a co-extrusion process of the carrier element and the thermally expandable composition. If using a two-step injection moulding process, in a first step, material for the carrier element is injected into the mould. After solidification, the cavity of the injection moulding tool is enlarged or adjusted, or the injection-moulded piece is transferred into another tool and the second component, in this case the material for the thermally expandable composition, is injected.

If the carrier element is not shaped by injection-moulding or extrusion, e.g., because it consist of a metal or alloy, it may be first manufactured by a suitable process and then introduced into the injection-moulding tool, and the thermally expandable composition may be injection-moulded into the tool where the carrier element was placed. Another possibility is to extrude the thermally expandable composition onto the pre-fabricated carrier element. Of course there is also the possibility of manufacturing the carrier element and the expandable composition element individually by a suitable process, and then attaching the expandable composition element to the carrier element by any suitable means, such as chemically or physically, e.g. by gluing or the like, or mechanically, e.g. by bolting, screwing, or the like.

Another aspect of the present invention is the use of the baffle and/or reinforcement element as described above to seal, baffle, or reinforce a cavity or hollow structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing a cavity or hollow structure, characterised in that an element comprising a thermally expandable composition according as described above is introduced into said cavity or hollow structure and subsequently thermally expanded such that said cavity or hollow structure is at least partially filled by the expanded composition. Preferred temperature for the thermal expansion process is between 110° C. and 210° C. Preferred baking time for the compositions is between 5 min and 30 min.

The invention is further explained in the following experimental part which, however, shall not be construed as limiting the scope of the invention.

Examples

1. Formulation of Example Compositions
1.1. Compositions

Eight example inventive compositions (C-1 to C-8) and four non-inventive reference compositions (R-1 to R-4) were prepared according to the procedure shown below. The exact individual compositions in wt.-%, based on the total weight of the individual respective composition, are listed in Table 1 (inventive compositions) and Table 2 (non-inventive compositions).

TABLE 1

Detailed inventive compositions C-1 to C-8 in wt.-% of ingredients based on the total weight of the compositions.

| Ingredient (wt.-%) | C-1 | C-2 | C-3 | C-4 | C-5 | C-6 | C-7 | C-8 |
|---|---|---|---|---|---|---|---|---|
| Polymer P1 | 34.5 | 34.5 | 34.5 | 34.5 | 34.5 | 34.5 | 34.5 | 34.5 |
| Polymer P2 | 20.5 | 20.5 | 20.5 | 20.5 | 20.5 | 20.5 | 20.5 | 20.5 |
| Peroxide | 1.4 | 1.4 | 2.4 | 1.4 | 1.4 | 1.4 | 1.4 | 1.4 |
| Antioxidant | 0.3 | 0.5 | 0.6 | 0.3 | — | — | — | — |
| Synergist | 0.3 | — | 0.3 | 0.3 | — | — | — | — |
| Blowing agent B1 | — | 9.25 | 7 | 7 | 7 | 7 | 7 | 7 |
| Blowing agent B2 | 12 | — | — | — | — | — | — | — |
| Activator A1 | 0.2 | — | — | — | — | — | — | 1.75 |
| Activator A2 | — | 0.2 | 2.5 | 2.5 | 5.25 | 3.5 | 2.5 | — |
| Activator A3 | — | — | 2.8 | 1.4 | 1.75 | 3.5 | 2.8 | 3.5 |
| Activator A4 | — | — | — | — | — | — | — | — |
| Processing agent | 6.7 | 6.7 | 6.7 | 6.7 | 6.7 | 6.7 | 6.7 | 6.7 |
| Adhesion promoter | 14 | 14 | 14 | 14 | 14 | 14 | 14 | 14 |
| Tackifier 1 | 7.4 | 7.4 | 7.4 | 7.4 | 7.4 | 7.4 | 7.4 | 7.4 |
| Acrylate | 0.7 | 0.7 | 1.1 | 0.7 | 0.7 | 0.7 | 0.7 | 0.7 |
| Filler | 2 | 4.85 | 0.2 | 3.3 | 0.8 | 0.8 | 2.5 | 2.55 |
| TOTAL | 100 | 100 | 100 | 100 | 100 | 100 | 100 | 100 |

TABLE 2

Detailed non-inventive reference compositions R-1 to R-4 in wt.-% of ingredients based on the total weight of the compositions.

| Ingredient (wt.-%) | R-1 | R-2 | R-3 | R-4 |
|---|---|---|---|---|
| Polymer P1 | 34.5 | 34.5 | 34.5 | 34.5 |
| Polymer P2 | 20.5 | 20.5 | 20.5 | 20.5 |
| Peroxide | 1.4 | 1.4 | 1.4 | 1.4 |
| Antioxidant | 0.3 | 0.3 | 0.3 | 0.3 |
| Synergist | 0.3 | 0.3 | 0.3 | 0.3 |
| Blowing agent B1 | 7 | 7 | — | — |
| Blowing agent B2 | — | — | 12 | 11 |
| Activator A1 | — | — | — | — |
| Activator A2 | — | — | — | — |
| Activator A3 | 3 | — | — | 3 |

TABLE 2-continued

Detailed non-inventive reference compositions R-1 to R-4 in wt.-% of ingredients based on the total weight of the compositions.

| Ingredient (wt.-%) | R-1 | R-2 | R-3 | R-4 |
|---|---|---|---|---|
| Activator A4 | — | 3 | — | — |
| Processing agent | 6.7 | 6.7 | 6.7 | 6.7 |
| Adhesion promoter | 14 | 14 | 14 | 14 |
| Tackifier 1 | 7.4 | 7.4 | 7.4 | 7.4 |
| Acrylate | 0.7 | 0.7 | 0.7 | 0.7 |
| Filler | 4.2 | 4.2 | 2.2 | 0.2 |
| TOTAL | 100 | 100 | 100 | 100 |

Details on the ingredients used in the inventive example compositions C-1 to C-8 and non-inventive reference compositions R-1 to R-4 described herein are listed in Table 3.

TABLE 3

Details on the ingredients used in the inventive and non-inventive example compositions C-1 to C-8 and R-1 to R-4.

| Ingredient | Description |
|---|---|
| Polymer P1 | Ethylene-vinyl acetate (EVA) with 18 wt.-% vinyl acetate monomer and a melt flow index (MFI) of 150 g/10 min (ATSM D1238) |
| Polymer P2 | EVA with 28 wt.-% vinyl acetate monomer and MFI of 6 g/10 min (ATSM D1238) |
| Peroxide | 1,1-Di-(tert.-butylperoxy)-3,3,5-trimethylcyclohexane (40 wt.-%) on calcium carbonate |
| Antioxidant | tetrakis(methylene(3,5-di-tert.-butyl-4-hydroxy-hydrocinnamate))methane |
| Synergist | Didodecyl 3,3'-thiodipropionate |
| Blowing agent B1 | Azodicarbonamide |
| Blowing agent B2 | 4,4'-Oxybis(benzenesulfonyl hydrazide) |
| Activator A1 | Urea, surface treated |
| Activator A2 | N,N-Dimethyl urea |
| Activator A3 | Zinc oxide |
| Activator A4 | Zinc stearate |
| Processing agent | Polyethylene wax (melting point 118° C. (ASTM D3954)) |
| Adhesion promoter | Ethylene-glycidyl methacrylate copolymer (8 wt.-% glycidyl methacrylate) with MFI of 5 g/10 min (ASTM D1238) |
| Tackifier 1 | Hydrocarbon resin (aromatically modified C5 hydrocarbon resin) |
| Acrylate | Dipentaerythritol pentaacrylate |
| Filler | Ground marble (95 wt.-% calcium carbonate) |

1.2. Mixing and Moulding Procedure

All inventive and non-inventive example compositions in this document were produced on standard production equipment suitable to compound thermoplastics with temperature control, i.e. twin screw extruder, Buss kneader or Banbury mixer. Polymers were mixed until homogeneous, then the system was cooled below activation of heat reactive raw materials. Heat reactive raw materials were then mixed into the system until homogeneous. Material was subsequently shape formed while hot into sample shapes that were used for expansion testing procedures.

2. Expansion Testing of Example Compositions

Expansion and expansion stability was tested in all samples by heat treatment (baking) of the individual samples at various temperatures during 10 min in an oven. The heating ramp from room temperature (23° C.) to the respective baking temperature was always 20 min. The temperatures and magnitude of expansion (in % based on the original volume prior to expansion) at the corresponding baking temperatures are shown in Table 4 for the inventive compositions and in Table 5 for the non-inventive reference compositions.

Expansions were quantified for each sample by measuring the density before and after expansion. The densities were determined according to DIN EN ISO 1183 using the water immersion method (Archimedes principle) in deionised water and a precision balance to measure the mass.

The expansion stability can be estimated by comparing the volumetric thermal expansion (in %, based on the original volume in the non-expanded state) of a sample at different temperatures.

TABLE 4

Volumetric thermal expansion (in %) of the inventive composition C-1 to C-8 samples at different temperatures. All samples were measured after 10 min baking at the indicated temperature. Heating ramp was in all samples 20 min.

| Example | C-1 | C-2 | C-3 | C-4 | C-5 | C-6 | C-7 | C-8 |
|---|---|---|---|---|---|---|---|---|
| Expansion at 140° C. [%] | 1183 | 1108 | 1527 | 1466 | 1633 | 1517 | 1409 | 1581 |
| Expansion at 180° C. [%] | 1635 | 1609 | n/m | n/m | n/m | n/m | n/m | n/m |
| Expansion at 200° C. [%] | 1412 | 1316 | 2041 | 1186 | 1173 | 1187 | 1102 | 1163 |

"n/m" means that this experimental value has not been measured.

TABLE 5

Volumetric thermal expansion (in %) of the non-inventive reference composition R-1 to R-4 samples at different temperatures. All samples were measured after 10 min baking at the indicated temperature. Heating ramp was in all samples 20 min.

| Example | R-1 | R-2 | R-3 | R-4 |
|---|---|---|---|---|
| Expansion at 140° C. [%] | 671 | 290 | 550 | 452 |
| Expansion at 180° C. [%] | n/m | n/m | 1100 | n/m |
| Expansion at 200° C. [%] | 317 | 359 | n/m | 1075 |

"n/m" means that this experimental value has not been measured.

The Results in Tables 4 and 5 show, that only the inventive compositions are able to create an expansion of >1000%, in preferred cases >1500%, both at low temperature (140° C.) and higher temperatures (180° C. up to 200° C.), even at the very short baking time of 10 minutes. This demonstrates the high expansion performance and expansion stability over the whole temperature range. The reference example compositions on the other hand either show poor low temperature performance or inadequate high temperature expansion.

3. Ultra-Low Temperature Experiments

Three additional experiments were performed to demonstrate the ultra-low temperature expansion at temperatures between 120° C. and 150° C., one of them inventive and two non-inventive reference examples. Details of the inventive composition C-9 and the reference examples R-5 and R-6 as well as the results of their volumetric thermal expansion are shown in Table 6. These examples were prepared according to the procedure mentioned further above.

TABLE 6

Detailed inventive composition C-9 and the non-inventive reference compositions R-5 and R-6 in wt.-% of ingredients based on the total weight of the compositions and results of volumetric thermal expansion at ultra-low expansion temperatures. Volumetric thermal expansions (in %) of the compositions were measured after 20 min baking at the indicated temperature. Heating ramp was in both samples 10 min.

| Ingredient | Type | C-9 | R-5 | R-6 |
|---|---|---|---|---|
| Polymer P | Ethylene-butyl acrylate (EBA) with 35 wt.-% butyl acrylate monomer and a MFI of 40 g/10 min (ATSM D1238) | 62 | 62 | 62 |
| Peroxide | Dibenzoyl peroxide (33 wt.-%) on inert carrier | 1.67 | 1.67 | 1.67 |
| Blowing agent B | 4,4'-Oxybis(benzenesulfonyl hydrazide) | 9 | 9 | 9 |
| Activator A1 | N,N-Dimethyl urea | 2 | — | — |
| Activator A2 | Zinc oxide | — | — | 3.72 |
| Adhesion promoter | Ethylene-glycidyl methacrylate copolymer (8 wt.-% glycidyl methacrylate) with MFI of 6 g/10 min (ASTM D1238) | 14 | 14 | 14 |
| Tackifier | Aromatically modified C5 hydrocarbon resin | 7.36 | 7.36 | 7.36 |
| Acrylate | Dipentaerythritol pentaacrylate | 0.65 | 0.65 | 0.65 |
| Filler | Ground marble (95 wt.-% calcium carbonate) | 3.32 | 5.32 | 1.60 |
| TOTAL | | 100 | 100 | 100 |
| Expansion at 120° C. [%] | | 1055 | 258 | 176 |
| Expansion at 150° C. [%] | | 1337 | 1143 | 1087 |

Table 6 shows that also an inventive composition optimized for the ultra-low temperature expansions at 120° C. to 150° C. shows excellent expansion properties with volumetric expansions exceeding 1000%, while the non-inventive reference compositions lack performance especially at 120° C.

4. Direct Comparison of Activators A

Another series of experiments were performed to compare different activators A in otherwise identical inventive compositions. For this, inventive compositions C-10 to C-12 were prepared, according to the preparation method described for the other examples above and using the ingredients and amounts listed in Table 7.

TABLE 7

Detailed inventive compositions C-10 to C-12 in wt.-% of ingredients based on the total weight of the compositions and results of volumetric thermal expansion (in %) of these samples at different temperatures. All samples were measured after 10 min baking at the indicated temperature. Heating ramp was in all samples 20 min.

| Ingredient | Type | C-10 | C-11 | C-12 |
|---|---|---|---|---|
| Polymer P1 | EVA with 18 wt.-% vinyl acetate monomer and MFI of 150 g/10 min (ATSM D1238) | 29.8 | 29.8 | 29.8 |
| Polymer P2 | EVA with 28 wt.-% vinyl acetate monomer and MFI of 6 g/10 min (ATSM D1238) | 15.7 | 15.7 | 15.7 |
| Peroxide 1 | Di-(2-tert.-butyl-peroxyisopropyl)-benzene (40 wt.-%) on calcium carbonate | 2.48 | 2.48 | 2.48 |
| Peroxide 2 | 1,1-Di-(tert.-butylperoxy)-3,3,5-trimethylcyclohexane (40 wt.-%) on calcium carbonate | 1.24 | 1.24 | 1.24 |
| Antioxidant | tetrakis(methylene(3,5-di-tert.-butyl-4-hydroxy-hydrocinnamate))methane | 0.26 | 0.26 | 0.26 |
| Blowing agent B | Azodicarbonamide | 7.77 | 7.77 | 7.77 |
| Activator A1 | N,N-Dimethyl urea | 2.73 | — | — |

TABLE 7-continued

Detailed inventive compositions C-10 to C-12 in wt.-% of ingredients based on the total weight of the compositions and results of volumetric thermal expansion (in %) of these samples at different temperatures. All samples were measured after 10 min baking at the indicated temperature. Heating ramp was in all samples 20 min.

| Ingredient | Type | Amount (wt-%) | | |
|---|---|---|---|---|
| | | C-10 | C-11 | C-12 |
| Activator A2 | N,N'-Dimethyl urea | — | — | 2.73 |
| Activator A3 | N,N,N',N'-Tetramethyl urea | — | 2.73 | — |
| Activator A4 | Zinc oxide | 3.11 | 3.11 | 3.11 |
| Adhesion promoter | Ethylene-glycidyl methacrylate copolymer (8 wt.-% glycidyl methacrylate) with MFI of 5 g/10 min (ASTM D1238) | 12.14 | 12.14 | 12.14 |
| Tackifier | Aromatically modified C5 hydrocarbon resin | 14.3 | 14.3 | 14.3 |
| Acrylate | Dipentaerythritol pentaacrylate | 1.75 | 1.75 | 1.75 |
| Filler | Ground marble (95 wt.-% calcium carbonate) | 8.72 | 8.72 | 8.72 |
| TOTAL | | 100 | 100 | 100 |
| Expansion at 140° C. [%] | | 1473 | n/m | 1362 |
| Expansion at 200° C. [%] | | 1957 | 2057 | 1974 |

"n/m" means that this experimental value has not been measured.

Table 7 shows that also inventive compositions C-10 to C-12 show excellent expansion properties with volumetric expansions exceeding 1300% both at high (200° C.) and low (140° C.) temperatures. These experiments illustrate that various embodiments of activator A have a highly beneficial impact on the expansion performance of blowing agent B.

5. Adhesion on Oily Surface Experiments

Four additional experiments were performed to demonstrate the adhesion properties of preferred embodiments of the inventive composition. Details of these inventive compositions C-13 to C-16 as well as the results of their volumetric thermal expansion and their adhesion to an oily substrate are shown in Table 8. These examples were prepared according to the procedure described further above. Adhesion was tested after expansion of the individual compositions at 140° C. during 10 min on samples where the compositions were expanded between two oil-covered hot-dip galvanized steel sheets. The oil used for testing was Ferrocote® 6130N (Quaker Chemical, USA) which was applied on the steel sheets with an amount of 3 g/m2. The values shown in the results table give the percentage of cohesive failure. Values lower than 100 indicate partial adhesive failure of the samples.

TABLE 8

Detailed inventive compositions C-13 to C-16 in wt.-% of ingredients based on the total weight of the compositions and results of volumetric thermal expansion (in %) of these samples at different temperatures and adhesion on oily steel (% cohesive failure). All samples were measured after 10 min baking at the indicated temperature. Heating ramp was in all samples 20 min.

| Ingredient | Type | Amount (wt-%) | | | |
|---|---|---|---|---|---|
| | | C-13 | C-14 | C-15 | C-16 |
| Polymer P1 | EVA with 18 wt.-% vinyl acetate monomer and MFI of 150 g/10 min (ATSM D1238) | 29.8 | 29.8 | 29.8 | 29.8 |
| Polymer P2 | EVA with 28 wt.-% vinyl acetate monomer and MFI of 6 g/10 min (ATSM D1238) | 15.7 | 15.7 | 15.7 | 15.7 |
| Peroxide 1 | Di-(2-tert.-butyl-peroxyisopropyl)-benzene (40 wt.-%) on calcium carbonate | 1.23 | 1.23 | 1.23 | 1.23 |
| Peroxide 2 | 1,1-Di-(tert.-butylperoxy)-3,3,5-trimethylcyclohexane (40 wt.-%) on calcium carbonate | 2.46 | 2.46 | 2.46 | 2.46 |
| Antioxidant | tetrakis(methylene(3,5-di-tert.-butyl-4-hydroxy-hydrocinnamate))methane | 0.29 | 0.29 | 0.29 | 0.29 |
| Blowing agent B | Azodicarbonamide | 7.8 | 7.8 | 7.8 | 7.8 |
| Activator A1 | N,N-Dimethyl urea | 2.55 | 2.55 | 2.55 | 2.55 |
| Activator A4 | Zinc oxide | 2.90 | 2.90 | 2.90 | 2.90 |
| Adhesion promoter | Ethylene-glycidyl methacrylate copolymer (8 wt.-% glycidyl methacrylate) with MFI of 5 g/10 min (ASTM D1238) | 12.03 | 12.03 | 12.03 | — |
| Tackifier 1 | Aromatically modified C5 hydrocarbon resin | 9.50 | 16.50 | — | 16.53 |
| Tackfier 2 | Liquid aliphatic C5 petroleum hydrocarbon resin | 7.00 | — | 16.50 | 12.00 |

TABLE 8-continued

Detailed inventive compositions C-13 to C-16 in wt.-% of ingredients based on the total weight of the compositions and results of volumetric thermal expansion (in %) of these samples at different temperatures and adhesion on oily steel (% cohesive failure). All samples were measured after 10 min baking at the indicated temperature. Heating ramp was in all samples 20 min.

| | | Amount (wt-%) | | | |
|---|---|---|---|---|---|
| Ingredient | Type | C-13 | C-14 | C-15 | C-16 |
| Acrylate | Dipentaerythritol pentaacrylate | 1.74 | 1.74 | 1.74 | 1.74 |
| Filler | Ground marble (95 wt.-% calcium carbonate) | 7.00 | 7.00 | 7.00 | 7.00 |
| | TOTAL | 100 | 100 | 100 | 100 |
| | Expansion at 140° C. [%] | 1885 | 1849 | 2005 | 1993 |
| | Expansion at 200° C. [%] | 2256 | 2058 | 2529 | 2151 |
| | Adhesion on oily steel [% cohesive failure] | 100 | 100 | 100 | 10 |

Of course the present invention is not limited to the examples described herein, which only illustrate the general principle of the present invention, or selected embodiments. A person of ordinary skill in the art would realise, however, that certain modifications would come within the teachings of the present invention. Therefore, the following claims should be studied to determine the true scope and content of the invention.

The invention claimed is:

1. A thermally expandable composition, comprising
   (a) at least one polymer P, cross-linkable by peroxide,
   (b) at least one peroxide,
   (c) optionally at least one antioxidant,
   (d) at least one chemical blowing agent B comprising azodicarbonamide or 4,4'-oxybis(benzenesulfonyl hydrazide),
   (e) at least one activator A comprising N,N-dimethylurea, and an amount of the at least one activator A is in a range of from 2.5 to 10 wt %, based on a total weight of the composition, and
   (f) a second activator including zinc oxide, and an amount of the second activator is in a range of from 1.4 to 10 wt %, based on the total weight of the composition,
   wherein the thermally expandable composition is configured to volumetrically expand at least 1409% at a temperature of 140° C.

2. The thermally expandable composition according to claim 1, wherein the at least one blowing agent B comprises azodicarbonamide.

3. The thermally expandable composition according to claim 1, wherein the at least one blowing agent B comprises 4,4'-oxybis(benzenesulfonyl hydrazide).

4. The thermally expandable composition according to claim 1, wherein the at least one antioxidant comprises tetrakis-(methylene-(3,5-di-(tert)-butyl-4-hydroxycinnamate)) methane and/or 2,4-diphenyl-4-methyl-1-pentene.

5. The thermally expandable composition according to claim 1, wherein the at least one polymer P comprises ethylene vinyl acetate and/or ethylene butyl acrylate.

6. The thermally expandable composition according to claim 5, wherein an amount of the ethylene vinyl acetate and/or the ethylene butyl acrylate is in a range of from 45.5 to 80 wt %, based on the total weight of the composition.

7. The thermally expandable composition according to claim 1, wherein the at least one polymer P comprises or consists essentially of at least two polymers P1 and P2, wherein P1 exhibits a melt flow index (MFI) of between 100 and 200 g/10 min, and P2 exhibits a melt flow index of between 0.1 and 60 g/10 min, wherein MFI is determined by ASTM D1238.

8. The thermally expandable composition according to claim 1, further comprising an adhesion promoter having glycidyl methacrylate groups.

9. The thermally expandable composition according to claim 1, wherein the amount of the second activator is in a range of from 3.11 to 10 wt %, based on the total weight of the composition.

10. A baffle and/or a reinforcement element for hollow structures, wherein the baffle and/or the reinforcement element comprises or consists essentially of the thermally expandable composition according to claim 1.

11. The baffle and/or the reinforcement element according to claim 10, comprising a carrier on which the thermally expandable composition is deposited or attached, wherein the carrier is made of a thermoplastic material.

12. A process for manufacturing the baffle and/or the reinforcement element according to claim 11, comprising injection-moulding the thermally expandable composition onto the carrier, or co-extruding the thermally expandable composition with the carrier.

13. The baffle and/or the reinforcement element according to claim 11, wherein the thermoplastic material is at least one thermoplastic polymer selected from the group consisting of epoxy resin, ethylene-vinyl acetate, polyurethane, polyolefin, and a derivate thereof.

14. A process for foaming the thermally expandable composition according to claim 1, comprising heating the thermally expandable composition to a temperature in a range of from 120 to 150 ° C. for a duration in a range of from 10 to 20 min.

15. A method comprising applying the baffle and/or the reinforcement element according to claim 10 to seal, baffle, or reinforce a cavity or hollow structure of a land-, water-, or air-vehicle, and/or a cavity of a building such that transmission of noise, vibrations, humidity, and/or heat is reduced, and/or an object surrounding the cavity is mechanically strengthened.

16. A method for sealing, baffling, and/or reinforcing a cavity or hollow structure, the method comprising introducing an element comprising the thermally expandable composition according to claim 1 into the cavity or hollow structure, and subsequently expanding the thermally expandable composition such that the element is thermally expanded, and the cavity or hollow structure is at least partially filled by the expanded composition.

* * * * *